United States Patent [19]

Nakamura

[11] Patent Number: 4,623,807
[45] Date of Patent: Nov. 18, 1986

[54] LINEAR PULSE MOTOR

[75] Inventor: Tooru Nakamura, Mie, Japan

[73] Assignee: Shinko Electric Co., Ltd., Japan

[21] Appl. No.: 749,492

[22] Filed: Jun. 27, 1985

[30] Foreign Application Priority Data

Jun. 29, 1984 [JP] Japan ............................. 59-136233

[51] Int. Cl.⁴ ............................................. H02K 41/00
[52] U.S. Cl. .......................................... 310/12; 310/90
[58] Field of Search ................................ 310/12–14, 310/27, 90

[56] References Cited

U.S. PATENT DOCUMENTS

| | | | |
|---|---|---|---|
| 3,807,313 | 4/1974 | Koyanagi | 310/13 X |
| 4,006,372 | 2/1977 | Brown, Jr. et al. | 310/13 |
| 4,427,905 | 1/1984 | Sutton | 310/13 |

*Primary Examiner*—Donovan F. Duggan
*Attorney, Agent, or Firm*—McDougall, Hersh & Scott

[57] ABSTRACT

A linear pulse motor includes a stationary body having two ridges on both sides, the two ridges extending substantially in parallel with each other along the lengthwise direction of the stationary body; a movable body; at least two axles fixed to the movable body; rolling bearings supported on both end portions of the two axles respectively, one of the rolling bearings being fixed to one of the end portions of the respective axle at its inner race, and the other of the rolling bearings being slidably fitted to the other of the end portions of the respective axle at its inner race; and coil springs arranged between the movable body and the other of the rolling bearings so as to press outer races of the ones of the rolling bearings to one side surface of one of the two ridges and outer races of the others of the rolling bearings to one side surface of the other of the two ridges, the one side surface of the one of the two ridges being destined for regulating the movement of the movable body.

5 Claims, 13 Drawing Figures

Prior Art FIG.1
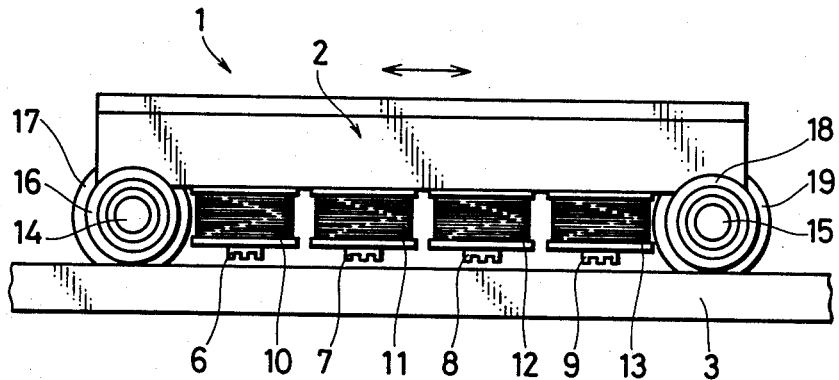
Prior Art FIG.2
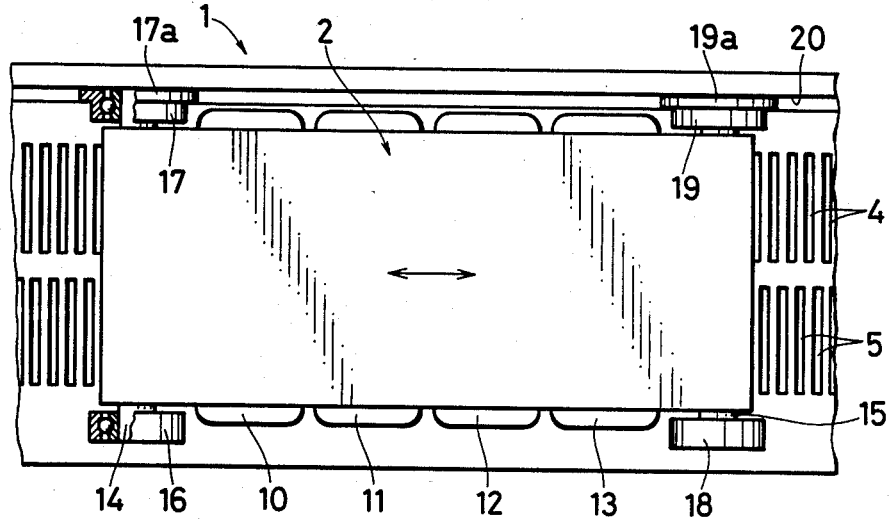
Prior Art FIG.3
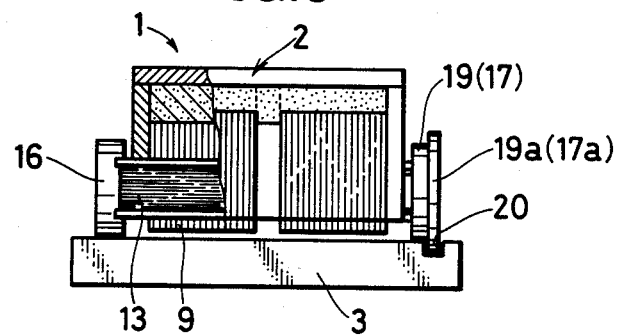

Prior Art FIG.4
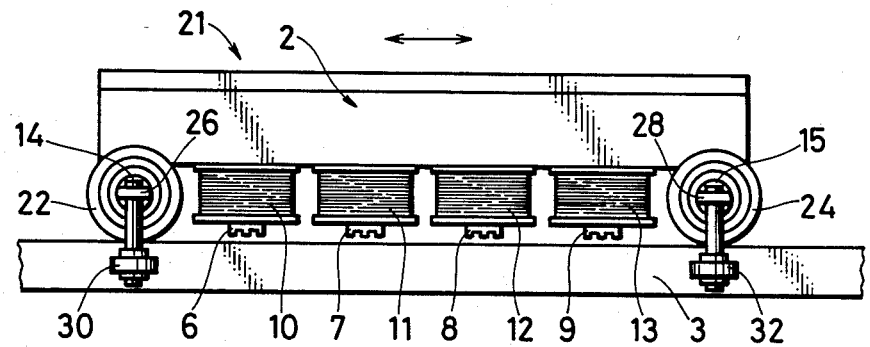
Prior Art FIG.5
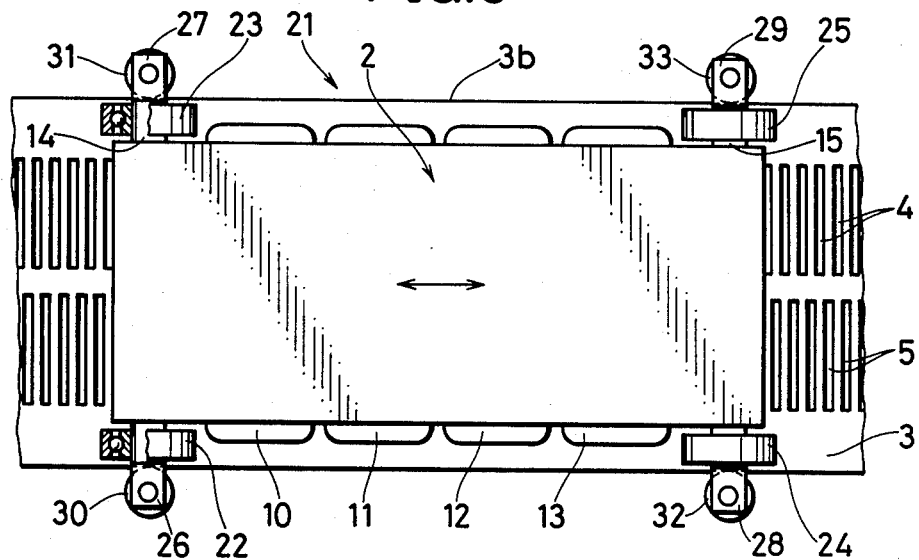
Prior Art FIG.6
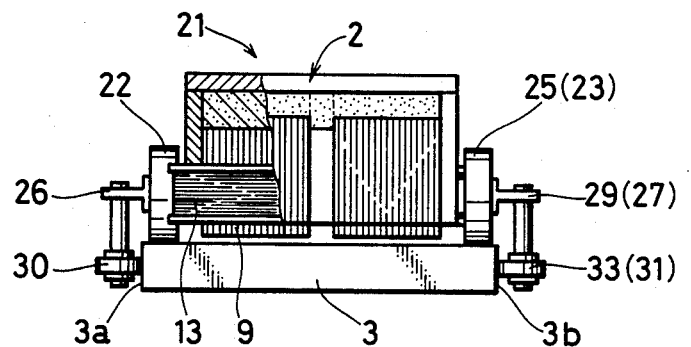

LINEAR PULSE MOTOR

BACKGROUND OF THE INVENTION

1. Field of the Invention

This invention relates to a linear pulse motor, and more particularly to a guide mechamism for a movable body in a linear pulse motor.

2. Description of the Prior Art

A linear pulse motor is widely used, for example, as a drive source for linearly moving and accurately positioning a head in a printer or an optical read-out apparatus. The head is fixed to a movable body in a linear pulse motor. A guide mechanism is required for linearly moving the movable body with high accuracy. It is unfavourable that the movable body moves meanderingly along a stator in the linear pulse motor.

The guide mechanism of the prior art is complicated in construction, and expensive. Or a highly accurate linearity cannot be obtained with the guide mechanism.

SUMMARY OF THE INVENTION

Accordingly, it is an object of this invention to provide a guide mechanism for a movable body in a linear pulse motor which is simple in construction, and can guide the movable body with high accuracy.

In accordance with an aspect of this invention, a linear pulse motor comprises: a stationary body having two ridges on both sides, said two ridges extending substantially in parallel with each other along the lengthwise direction of said stationary body; a movable body; at least two axles fixed to said movable body; rolling bearings supported on both end portions of said two axles respectively, one of said rolling bearings being fixed to one of said end portions of the respective axle at its inner race, and the other of said rolling bearings being slidably fitted to the other of said end portions of the respective axle at its inner race and; urging means arranged between said movable body and said others of the rolling bearings so as to press outer races of said ones of the rolling bearings to one side surface of one of said two ridges and outer races of said others of the rolling bearings to one side surface of the other of said two ridges, said one side surface of the one of the two ridges being destined for regulating the movement of said movable body.

The foregoing and other objects, features, and advantages of the present invention will be more readily understood upon consideration of the following detailed description of the preferred embodiments of the invention, taken in conjunction with the accompanying drawing.

BRIEF DESCRIPTION OF THE DRAWINGS

FIG. 1 is a side view of a linear pulse motor of one prior art, in which a stationary body is shown in partially broken view;

FIG. 2 is a plan view of the linear pulse motor of FIG. 1;

FIG. 3 is a partially broken front view of the linear pulse motor of FIG. 1;

FIG. 4 is a side view of a linear pulse motor of another prior art, in which a stationary body is shown in partially broken view;

FIG. 5 is a plan view of the linear pulse motor of FIG. 4;

FIG. 6 is a partially broken front view of the linear pulse motor of FIG. 4;

DETAILED DESCRIPTION OF PREFERRED EMBODIMENTS

Figure 7:
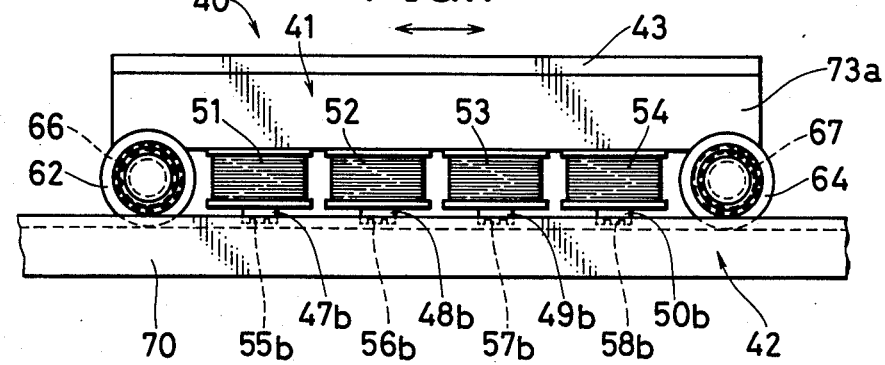
FIG. 7 is a side view of a linear pulse motor according to a first embodiment of this invention, in which a stationary body is shown in partially broken view.

First, for facilitating the understanding of this invention, prior art linear pulse motors will be described with reference to FIG. 1 to FIG. 6.

FIG. 1 to FIG. 3 show one linear pulse motor of the prior arts. The linear pulse motor 1 consists of a movable body 2 and a stator or stationary body 3. Magnetic teeth 4 and 5 are formed in two rows, in the stationary body 3. The movable body 2 includes iron cores 6, 7, 8 and 9, and coils 10, 11, 12 and 13 wound on the iron cores 6 to 9 respectively. Plural teeth are formed on lower ends of the iron cores 6 to 9, and face to the magnetic teeth 4 and 5 of the stationary body 3 with a slight air gap.

Axles 14 and 15 are fixed to the movable body 2. Ball bearings 16, 17 and 18 and 19 are fixed at their inner races to the ends of the axles 14 and 15, respectively. Flanges 17a and 19a are formed on the outer races of the ball bearings 17 and 19 which are at the same side of the movable body 2. A straight groove 20 for guiding the movable body 2 is formed along the rows of the teeth 4 and 5 in one side of the stationary body 3. The flanges 17a and 19a of the ball bearings 17 and 9 are fitted to the groove 20.

When the coils 10 to 13 are energized in a predetermined order, a stepwise drive force is imparted to the movable body 2. Although the movable body 2 moves forwards step by step in a predetermined pitch, it actually looks to move continuously forwards.

Some clearance is made between the flanges 17a and 19a of the bearing 17 and 18, and the groove 20. Accordingly, the movable body 2 staggers in the forward movement within the range of the clearance. A high linearity cannot be obtained with such a guide mechanism. The ball bearings 17 and 18 with the flanges 17a and 18a are expensive.

FIG. 4 to FIG. 6 show another linear pulse motor 21 of the prior arts. Parts in FIG. 4 to FIG. 6 which correspond to those in FIG. 1 to FIG. 3 are designated by the same reference numerals.

In the linear pulse motor 21, usual ball bearings 22, 23 and 24, 25 are fixed at their inner races to the end portions of the axles 14 and 15, respectively. The ends of the axles 14 and 15 are projected from the inner races of the ball bearings 22 to 25. Support portions 26 to 29 are formed integrally with the ends of the axles 14 and 15. Guide rollers 30 to 33 are supported by the support portions 26 to 29, respectively, and they contact with the straight guide side surfaces 3a and 3b of the stationary body 3.

A high linearity may be obtained by such a guide mechanism. However, it is complicated in construction. It is difficult to manufacture the respective parts so as to obtain a high linearity. Accordingly, it requires much cost.

Next, linear pulse motors according to embodiments of this invention will be described with reference to FIG. 7 to FIG. 13.

FIG. 7 to FIG. 10 show a linear pulse motor according to a first embodiment of this invention.

Figure 8:
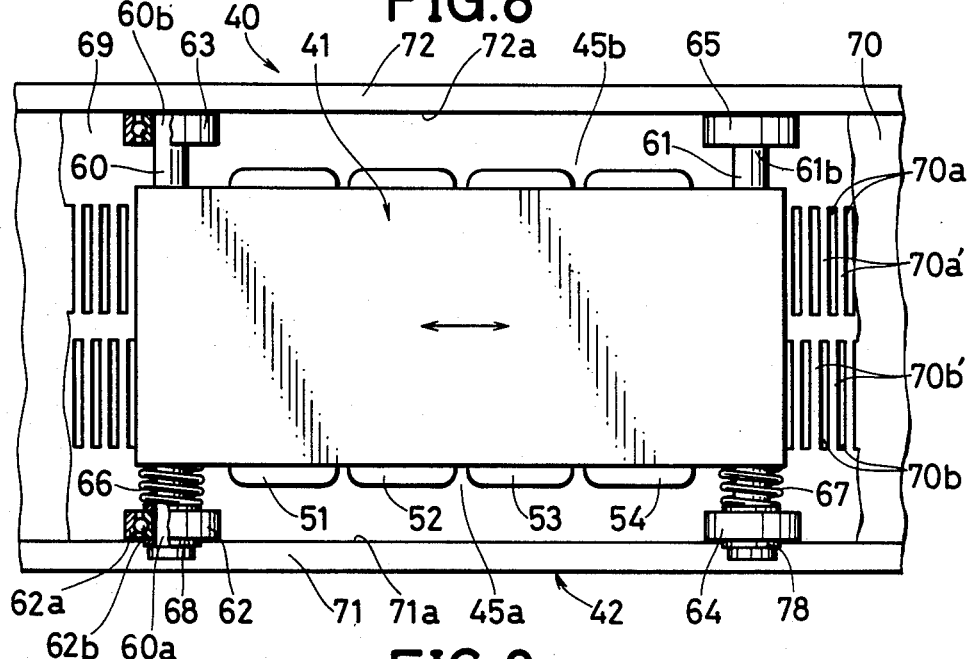
FIG. 8 is a plan view of the linear pulse motor of FIG. 7.
Figure 9:
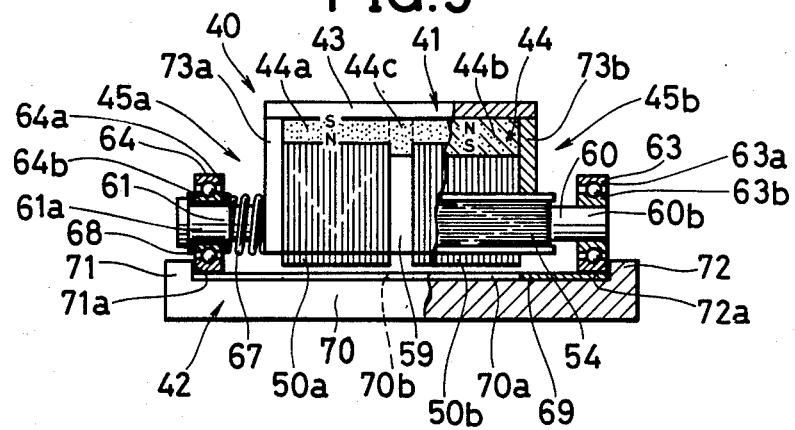
FIG. 9 is a partially broken front view of the linear pulse motor of FIG. 7.
Figure 10:
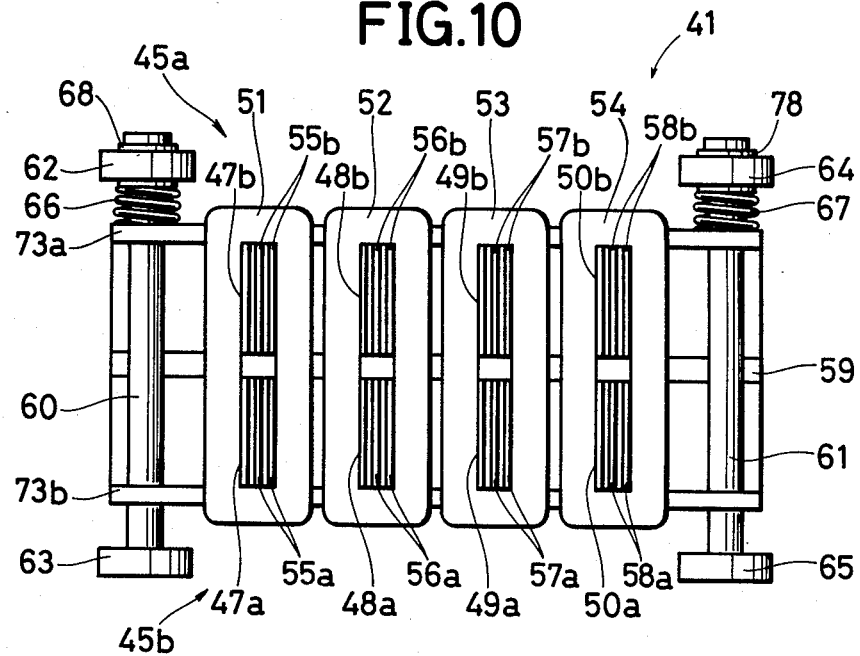
FIG. 10 is a back view of a movable body in FIG. 7.

A linear pulse motor is generally designated by a reference numeral 40 in FIG. 7 to FIG. 9. It consists of a movable body 41 and a stator or stationary body 42.

The movable body 41 includes a pair of iron cores 45a and 45b which have four downwardly extending magnetic pole portions 47a to 50a and 47b to 50b, respectively. A non-magnetic material 59 is interposed between the iron cores 45a and 45b. Coils 51, 52, 53 and 54 are wound on the magnetic pole portions 47a and 47b, 48a and 48b, 49a and 49b, and 50a and 50b, respectively. A permanent magnet 44 having regions 44a and 44b polarized oppositely to each other is attached to the upper surfaces of the iron cores 45a and 45b, respectively. A non-polarized region 44c is formed between the regions 44a and 44b. A back plate 43 made of magnetic material is mounted on the permanent magnet 44. Three teeth 55a to 58a and 55b to 58b, are formed at regular pitches on the lower end surfaces of the magnetic pole portions 47a to 50a and 47b to 50b, respectively. The pitches of the teeth 55a to 58a and 55b to 58b are equal to each other. However, the teeth 55a to 58a and 55b to 58b of the magnetic pole portions 47a to 50a and 47b to 50b are shifted, in phase from one another by length of ¼ pitch, in the order of 55a (55b), 57a (57b), 56a (56b) and 58a (58b).

Axles 60 and 61 are fixedly supported by side plates 73a and 73b which is fixed to the back plate 43. The axles 60 and 61, and the side plates 73a and 73b are made of non-magnetic material. Ball bearings 63 and 65 are fixed to one end portions 60b and 61b, while ball bearings 62 and 64 are slidably supported on the other end portions 60a and 61a. The one end portions 60b and 61b of the axles 60 and 61 are ball bearings 63 and 65 to the movable body 41 are constant. The other end portions 60a and 61a of the axles 60 and 61 are slidably fitted to inner races 62b and 64b of the ball bearings 62 and 64.

Coil springs 66 and 67 are arranged in compression between the side plate 73a and the inner races 62b and 64b of the ball bearings 62 and 64 which are prevented from falling out by stopper rings 68 and 78 fixed to the axles 60 and 61. The ball bearings 62, 64 and the movable body 41 are urged in the opposite directions so as to be far from each other, by the coil springs 66 and 67.

The stationary body 42 includes a base member 70 of magnetic material and a thin magnetic plate 69 which is 0.3 to 0.5 mm thick. Numeral slits 70a and 70b are formed at regular pitches in parallel two rows, in the magnetic plate 69. Slitless portions 70a' and 70b' between the slits 70a and 70b function as magnetic teeth. The pitches (P) of the magnetic teeth 70a' and 70b' are equal to each other, but the former is shifted from the latter by a half of pitch (½ P). Further, they are equal to the pitches of the magnetic teeth 55a to 58a and 55b to 58b of the magnetic pole portions 47a to 50a and 47b to 50b.

Ridges 71 and 72 are straightly formed integrally with both sides of the base member 70, which are substantially parallel to each other along the lengthwise direction of the stationary body 42. An inside surface 72a of the one ridge 72 functions as a reference or guide surface for the movable body 41. It is straightly manufactured with high accuracy. However, an inside surface 71a of the other ridge 71 does not need to be manufactured so accurately straight. Outer races 63a and 65a of the ball bearings 63 and 65 are pressed to the inside surface 72a of the one ridge 72 by the coil springs 66 and 67, while outer races 62a and 64a of the ball bearings 62 and 64 are pressed to the inside surface 71a of the other ridge 71 by the coil springs 66 and 67.

The coil 51 is connected in series with the coil 52. The coil 51 and 52 are wound in the opposite directions to each other. The coil 53 is connected in series with the coil 54. The coil 53 and 54 are wound in the opposite directions to each other.

Next, there will be described operations of the above described linear pulse motor.

A positive DC current +I is supplied to the coils 51 and 52 which are connected in series with each other. Induced magnetic flux $\phi c$ in the iron cores 45a and 45b flows through the magnetic pole portions 47a and 47b→air gap→the stationary body 42→air gap→the magnetic pole portions 48a and 48b→the magnetic pole portions 47a and 47b. Accordingly, it is added to the magnetic flux $\phi m$ from the permanent magnet 44 in the air gap between the magnetic pole portions 47a, 48b and the stationary body 42, while it is cancelled with the magnetic flux $\phi m$ from the permanent magnet 44 in the air gap between the magnetic pole portions 47b, 48a and the stationary body 42. Magnetic attraction occurs between the teeth 55a and 56b of the magnetic pole portions 47a and 48b and the teeth 70a' and 70b' of the stationary body 42. The movable body 41 steps forwards by ¼ pitch so that the teeth 55a and 56b of the movable body 41 come to face directly to the teeth 70a' and 70b' of the stationary body 42.

At the same time when the coils 51 and 52 are deenergized, the coils 53 and 54 are energized. The positive DC current +I is supplied to the coils 53 and 54. Induced magnetic flux $\phi c$ in the iron cores 45a and 45b flows through the magentic pole portions 49a and 49b→air gap→the stationary body 42→air gap→the magnetic pole portions 50a and 50b→the magnetic pole portions 49a and 49b. Accordingly, it is added to the magnetic flux $\phi m$ from the permanent magnet 44 in the air gap between the magnetic pole portions 49a, 50b and the stationary body 42, while it is cancelled with the magnetic flux $\phi m$ from the permanent magnet 44 in the air gap between the magnetic pole portions 49b, 50a and the stationary body 42. Magnetic attraction occurs between the teeth 57a and 58b of the magnetic pole portion 49a and 50b and the teeth 70a' and 70b' of the stationary body 42. The movable body 41 steps forwards by ¼ pitch so that the teeth 57a and 58b of the movable body 41 come to face directly to the teeth 70a' and 70b' of the stationary body 42.

At the same time when the coils 53 and 54 are deenergized, the coils 51 and 52 are energized. A negative DC current −I is supplied to the coils 51 and 52 for the predetermined time. Induced magnetic flux $\phi c$ in the iron cores 45a and 45b flows through the magnetic pole portions 48a and 48b→air gap→the stationary body 42→air gap→the magnetic pole portions 47a and 47b→the magnetic pole portions 48a and 48b. Accordingly, it is added to the magnetic flux φm from the permanent magnet 44 in the air gap between the magnetic pole portions 48a, 47b and the stationary body 42, while it is cancelled with the magnetic flux φm from the permanent magnet 44 in the air gap between the magentic pole portions 47a, 48b and the stationary body 42. Magnetic attraction occurs between the teeth 55b and 56a of the magnetic pole portions 47b and 48a and the teeth 70a' and 70b' of the stationary body 42. The movable body 41 steps forwards by ¼ pitch so that the teeth 55b and 56a of the movable body 41 come to face directly to the teeth 70a' and 70b' of the stationary body 42.

At the same time when the coils 51 and 52 are deenergized, the coils 53 and 54 are energized. A negative DC current −I is supplied to the coils 53 and 54 for the predetermined time. Induced magnetic flux φc in the iron cores 45a and 45b flows through the magnetic pole portions 50a and 50b→air gap→the stationary body 42→air gap→the magnetic pole portions 49a and 49b→the magnetic pole portions 50a and 50b. Accordingly, it is added to the magnetic flux φm from the permanent magnet 44 in the air gap between the magnetic pole portions 49b, 50a and the stationary body 42, while it is cancelled with the magnetic flux φm from the permanent magnet 44 in the air gap between the magentic pole portions 49a, 50b and the stationary body 42. Magnetic attraction occurs between the teeth 58a and 57b of the magnetic pole portions 50b and 49a and the teeth 70a' and 70b' of the stationary body 42. The movable body 41 steps forwards by ¼ pitch so that the teeth 58a and 57b of the movable body 41 come to face directly to the teeth 70a' and 70b' of the stationary body 42.

Thus, the coils 51, 52 and 53, 54 are alternately energized in the above described manner. Magnetic attraction occurs between the teeth 55a (55b) to 58a (58b) of the movable body 41 and the teeth 70a' and 70b' of the stationary body 42 in order of teeth 55a (56b), 57a (58b), 56a (55b) and 58a (57b). The movable body 41 is moved forward step by step. Actually, it looks to move continuously.

Since the outer races 63a and 65a of the ball bearings 63 and 65 are always pressed to the inside surface 72a of the straight ridge 72 by action of the coil springs 66 and 67, and the relative position of the ball bearings 63 and 65 to the movable body 41 is constant, the movable body 41 can move along the straight line with high accuracy. Even when the distance between the inside surface 71a and 72a of the ridges 71 and 72 changes along the lengthwise directions of the stationary body 42, the movable body 41 can be straightly guided by the inside surface 72a of the one ridge 72 with high accuracy. The other ball bearings 62 and 64 can move along the axles 60 and 61 in accordance with the change of the distance between the inside surfaces 71a and 72a of the ridges 71 and 72.

Figure 11:
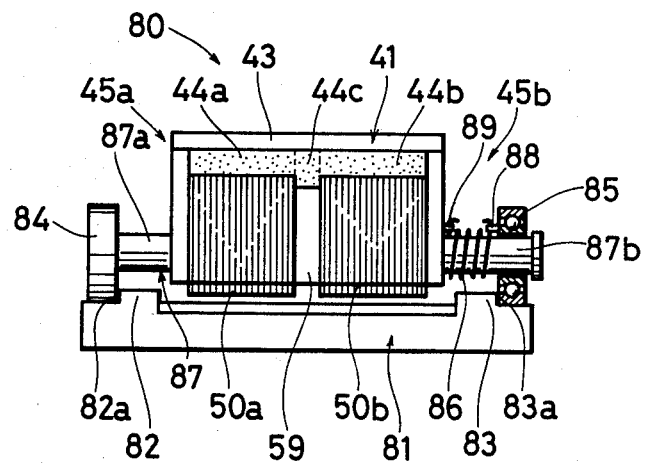
FIG. 11 is a partially broken front view of a linear pulse motor according to a second embodiment of this invention.

FIG. 11 shows a linear pulse motor 80 according to a second embodiment of this invention. Parts in FIG. 11 which correspond to those in FIG. 7 to FIG. 10 are designated by the same reference numerals.

One end portion 87a of an axle 87 fixed to the movable body 41 is tightly fitted to an inner race of a ball bearings 84, while another end portion 87b of the axle 87 is slidably fitted to an inner race of a ball bearing 85.

Straight ridges 82 and 83 are formed on both sides of a stationary body 81. An outside surface 82a of the one ridge 82 is accurately machined for guiding the movable body 41. An outside surface 83a of the other ridge 83 does not need to be so accurately machined.

A coil spring 86 is arranged in tension between the side plate of the movable body 41 and the inner race of the ball bearing 85. One end of the coil spring 86 is anchored to a part 89 of the side plate, while another end of the coil spring 86 is anchored to a part 88 of the inner race of the ball bearing 85. Since the coil spring 86 is tensioned, the movable body 41 is pulled rightwards, while the ball bearing 85 is pulled leftwards, in FIG. 11. Accordingly, the outer race of the ball bearing 84 is pressed to the outside surface 82a of the one ridge 82 for guiding the movable body 41, the relative position of which is constant to the ball bearing 84, and the outer race of the ball bearing 85 is pressed to the outside surface 83a of the other ridge 83.

Although not shown, another axle is fixed to the movable body 41, and ball bearings are supported on both end portions of the other axle in the same manner as the ball bearings 84 and 85.

As in the first embodiment, the movable body 41 can move along the straight line with high accuracy. Even when the distance between the outside surfaces 82a and 83a of the ridges 82 and 83 changes along the lengthwise direction of the stationary body 81, the movable body 41 can be straightly guided by the outside surface 82a of the one ridge 82 with high accuracy. The other ball bearings 85 can move along the axles 87 in accordance with the change of the distance between the outside surfaces 82a and 83a of the ridges 82 and 83.

Figure 12:
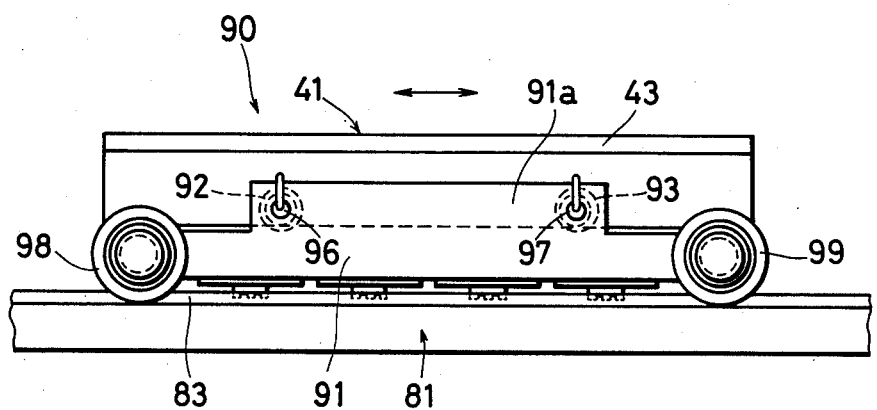
FIG. 12 is a side view of a linear pulse motor according to a third embodiment of this invention, in which a stationary body is shown in partially broken view.
Figure 13:
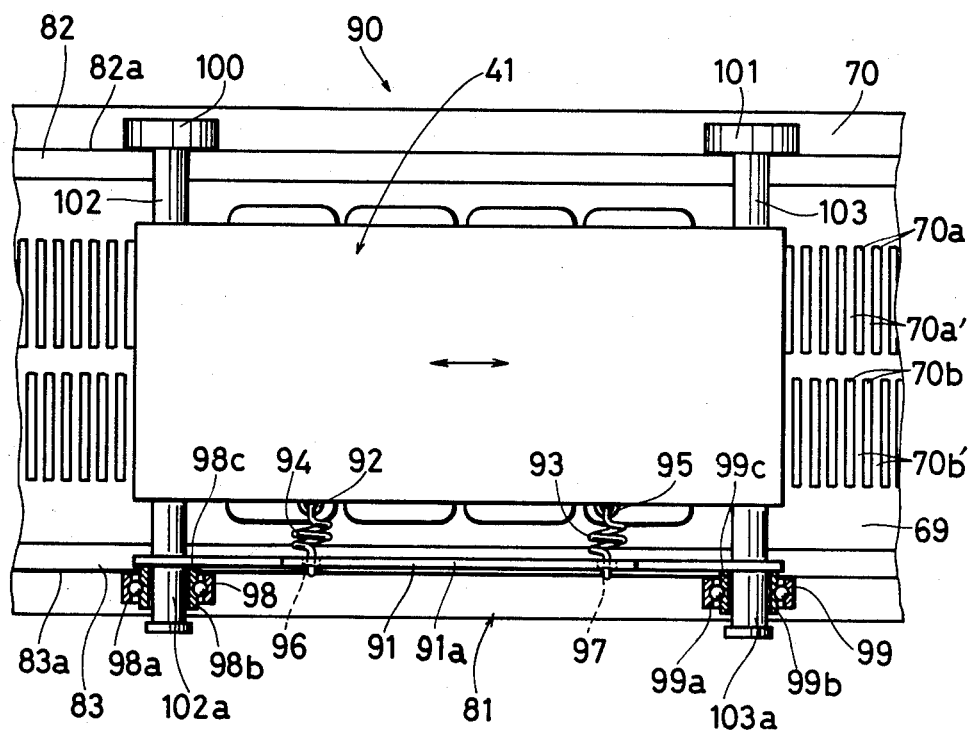
FIG. 13 is a plan view of the linear pulse motor of FIG. 12.

FIG. 12 and FIG. 13 show a linear pulse motor 90 according to a third embodiment of this invention. Parts in FIG. 12 and FIG. 13 which correspond to those in FIG. 7 to FIG. 10, are denoted by the same reference numerals.

Axles 102 and 103 are fixed to the movable body 41. Ball bearings 100 and 101 are fixed to one end portions and of the axles 102 and 103. Accordingly, relative positions of the ball bearings 100 and 101 to the movable body 41 are constant. Other end portions 102a and 103a of the axles 102 and 103 are slidably fitted to inner races 98b and 99b of ball bearings 98 and 99. An oblong support plate 91 is fixed at both ends to flange portions 98c and 99c integrally formed with the inner race 98b and 99b of the ball bearings 98 and 99, and it is slidable along the axles 102 and 103. An upwardly extending portion 91a is formed integrally with the oblong plate 91. Tension coil springs 94 and 93 are arranged between the upwardly extending portion 91a and the side plate 73a of the movable body 41. One end of the coil springs 94 and 93 are anchored to hooks 92 and 95 integrally formed with the side plate 73a of the movable body 41. Other ends of the coil springs 94 and 93 are anchored to engaging holes 96 and 97 formed in the upwardly extending portion 91a.

Straight ridges 82 and 83 are formed on both sides of a stationary body 81. Outer races of the ball bearings 100 and 101 are pressed to an outside surface of 82a of the one ridge 82 for guiding the movable body 41 by the tension coil springs 92 and 93, while outer races 98a and 99a of the ball bearings 98 and 99 are pressed to an outside surface 83a of the other ridge 83 by the tension coil springs 92 and 93. It will be understood that the third embodiment has the same effect as the first and second embodiment.

While the preferred embodiments have been described, variations thereto will occur to those skilled in the art within the scope of the present inventive concepts which are delineated by the following claims.

For example, in the above embodiments, the coil spring is used as urging means. However, instead, leaf spring or rubber spring may be used. Or other urging means may be used.

Further in the above embodiments, the ball bearing is used as a rolling bearing. However, instead, a needle bearing may be used.

This invention may be applied to various linear pulse motors of the prior art.

Further, in the first embodiment, the stationary body 42 consists of the block-like base member 70 and the magnetic plate 69 attached to the base member 70. Instead, the stationary body may consist of a relatively thin first plate bent in U shaped form, a relatively thick second plate of magnetic material attached to the bottom of the first plate and the magnetic plate 69 attached to the second plate. Both upwardly bent portions of the first plate function as the two ridges of this invention.

Further, in the above embodiments, the magnetic teeth are made by forming slits in the magnetic plate 69. Instead, they may be formed as ridges.

What is claimed is:

1. In a linear pulse motor comprising a head fixed to a movable body, and a stationary body comprising a stator, the improvement comprising support means for maintaining a constant air gap between said stationary body and said movable body, said support means including a pair of spaced-apart ridges defined by said stationary body, said pair of ridges extending substantially in parallel with each other along the lengthwise direction of said stationary body, at least two axles fixed to said movable body and including respective end portions, rolling bearings supported on said end portions of said two axles respectively, said rolling bearings riding on said stationary body so as to maintain said air gap, one of said rolling bearings being fixed to one of said end portions of each of said axles, and the other of said rolling bearings being slidably fitted to the other of said end portions, and including biasing means arranged between said movable body and said others of the rolling bearings so as to press side surfaces of said ones of the rolling bearings against a side surface of one of said ridges, and to press side surfaces of said others of the rolling bearings against a side surface of the other of said ridges, said side surface of said one of said ridges serving as a reference line for regulating the movement of said movable body.

2. A linear pulse motor according to claim 1, in which said biasing means urges said movable body and said others of the rolling bearings so as to be far from each other, and said side surfaces of said ridges are inside surfaces, respectively.

3. A linear pulse motor according to claim 1, in which said biasing means urges said movable body and said others of the rolling bearings so as to be near to each other, and said side surfaces of said ridges are outside surfaces, respectively.

4. A linear pulse motor according to claim 2, in which said biasing means is a compression coil spring.

5. A linear pulse motor according to claim 3, in which said biasing means is a tension coil spring.

* * * * *

UNITED STATES PATENT OFFICE
CERTIFICATE OF CORRECTION

Patent No. 4,623,807         Dated November 18, 1986

Inventor(s) T. Nakamura

It is certified that error appears in the above-identified patent and that said Letters Patent are hereby corrected as shown below:

Column 3, line 46, between "are" and "ball" insert -- tightly fitted to inner races 63b and 65b of the ball bearings 63 and 65. Accordingly, relative positions of the --

Signed and Sealed this

Third Day of March, 1987

*Attest:*

DONALD J. QUIGG

*Attesting Officer*     *Commissioner of Patents and Trademarks*